United States Patent
White

(10) Patent No.: US 6,355,168 B1
(45) Date of Patent: Mar. 12, 2002

(54) COOKING OIL STORAGE AND FILTERING SYSTEM

(76) Inventor: Lucious White, 120 Hobart Ave., Syracuse, NY (US) 13205

( * ) Notice: Subject to any disclaimer, the term of this patent is extended or adjusted under 35 U.S.C. 154(b) by 0 days.

(21) Appl. No.: 09/663,173

(22) Filed: Sep. 15, 2000

(51) Int. Cl.[7] .................. B01D 29/085; A47J 37/12; A47J 43/28
(52) U.S. Cl. .................. 210/236; 210/238; 210/244; 210/474; 210/477; 99/408; 99/446
(58) Field of Search .................. 210/236, 238, 210/477, 474, 244; 99/408, 446

(56) References Cited

U.S. PATENT DOCUMENTS

| | | | |
|---|---|---|---|
| 1,641,051 A | | 8/1927 | Rheney |
| 1,948,771 A | | 2/1934 | Rucker |
| 2,247,040 A | * | 6/1941 | Whitsett |
| 2,450,520 A | | 10/1948 | Maddux |
| 3,385,201 A | * | 5/1968 | Martin |
| 3,450,024 A | * | 6/1969 | Martin |
| 3,479,949 A | * | 11/1969 | Reynolds et al. |
| 3,505,947 A | * | 4/1970 | Bresaola |
| 4,517,886 A | | 5/1985 | Bales |
| 4,555,339 A | | 11/1985 | Graves et al. |
| 4,604,203 A | * | 8/1986 | Kyle |
| 4,739,697 A | * | 4/1988 | Roberts |
| 4,909,137 A | | 3/1990 | Brugneli |
| 5,030,357 A | | 7/1991 | Lowe |
| 5,322,196 A | | 6/1994 | Burton |
| D352,212 S | | 11/1994 | Burton |
| 6,126,018 A | * | 10/2000 | Cone et al. |

FOREIGN PATENT DOCUMENTS

| | | | |
|---|---|---|---|
| JP | 7.265610 | * | 10/1995 |
| JP | 08.187191 | * | 7/1996 |
| JP | 10.117950 | * | 5/1998 |
| JP | 10.202022 | * | 8/1998 |
| JP | 10-295565 | * | 11/1998 |
| JP | 11.035970 | * | 2/1999 |

* cited by examiner

*Primary Examiner*—Thomas M. Lithgow

(57) ABSTRACT

A cooking oil storage and filtering system for filtering and storing used cooking oil prior to reuse. The cooking oil storage and filtering system includes an housing assembly with a funnel portion, an upper portion, a bottom portion, a pair of track members, and a housing lid member; a filter assembly which is slidably insertable into the housing assembly along the track members and is designed for removing particulate matter from a quantity of cooking oil, and a kettle assembly, which can be positioned within the bottom portion of the housing and is designed for storing the quantity of cooking oil.

12 Claims, 4 Drawing Sheets

COOKING OIL STORAGE AND FILTERING SYSTEM

BACKGROUND OF THE INVENTION

1. Field of the Invention

The present invention relates to grease containers and more particularly pertains to a new cooking oil storage and filtering system for filtering and storing used cooking oil prior to reuse.

2. Description of the Prior Art

The use of grease containers is known in the prior art. More specifically, grease containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,322,196; U.S. Pat. No. 4,555,339; U.S. Pat. Nos. Des. 352,212; U.S. Pat. Nos. 4,909,137; 4,517,886; 5,030,357; 2,450,520; 1,641,051; and 1,948,771.

While these devices fulfill their respective, particular objectives and requirements, the aforementioned patents do not disclose a new cooking oil storage and filtering system. The inventive device includes an housing assembly with a funnel portion, an upper portion, a bottom portion, a pair of track members, and a housing lid member; a filter assembly which is slidably insertable into the housing assembly along the track members and is designed for removing particulate matter from a quantity of cooking oil, and a kettle assembly, which can be positioned within the bottom portion of the housing and is designed for storing the quantity of cooking oil.

In these respects, the cooking oil storage and filtering system according to the present invention substantially departs from the conventional concepts and designs of the prior art, and in so doing provides an apparatus primarily developed for the purpose of filtering and storing used cooking oil prior to reuse.

SUMMARY OF THE INVENTION

In view of the foregoing disadvantages inherent in the known types of grease containers now present in the prior art, the present invention provides a new cooking oil storage and filtering system construction wherein the same can be utilized for filtering and storing used cooking oil prior to reuse.

The general purpose of the present invention, which will be described subsequently in greater detail, is to provide a new cooking oil storage and filtering system apparatus and method which has many of the advantages of the grease containers mentioned heretofore and many novel features that result in a new cooking oil storage and filtering system which is not anticipated, rendered obvious, suggested, or even implied by any of the prior art grease containers, either alone or in any combination thereof.

To attain this, the present invention generally comprises an housing assembly with a funnel portion, an upper portion, a bottom portion, a pair of track members, and a housing lid member; a filter assembly which is slidably insertable into the housing assembly along the track members and is designed for removing particulate matter from a quantity of cooking oil, and a kettle assembly, which can be positioned within the bottom portion of the housing and is designed for storing the quantity of cooking oil.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cooking oil storage and filtering system apparatus and method which has many of the advantages of the grease containers mentioned heretofore and many novel features that result in a new cooking oil storage and filtering system which is not anticipated, rendered obvious, suggested, or even implied by any of the prior art grease containers, either alone or in any combination thereof.

It is another object of the present invention to provide a new cooking oil storage and filtering system which may be easily and efficiently manufactured and marketed.

It is a further object of the present invention to provide a new cooking oil storage and filtering system which is of a durable and reliable construction.

An even further object of the present invention is to provide a new cooking oil storage and filtering system which is susceptible of a low cost of manufacture with regard to both materials and labor, and which accordingly is then susceptible of low prices of sale to the consuming public, thereby making such cooking oil storage and filtering system economically available to the buying public.

Still yet another object of the present invention is to provide a new cooking oil storage and filtering system which provides in the apparatuses and methods of the prior art some of the advantages thereof, while simultaneously overcoming some of the disadvantages normally associated therewith.

Still another object of the present invention is to provide a new cooking oil storage and filtering system for filtering and storing used cooking oil prior to reuse.

Yet another object of the present invention is to provide a new cooking oil storage and filtering system which includes an housing assembly with a funnel portion, an upper portion, a bottom portion, a pair of track members, and a housing lid member; a filter assembly which is slidably insertable into the housing assembly along the track members and is designed for removing particulate matter from a quantity of cooking oil, and a kettle assembly, which can be positioned within the bottom portion of the housing and is designed for storing the quantity of cooking oil.

Still yet another object of the present invention is to provide a new cooking oil storage and filtering system that filters cooking oil while hot and stores the cooking oil for reuse.

Even still another object of the present invention is to provide a new cooking oil storage and filtering system that provides and aesthetically pleasing repository for used cooking oil prior to reuse.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
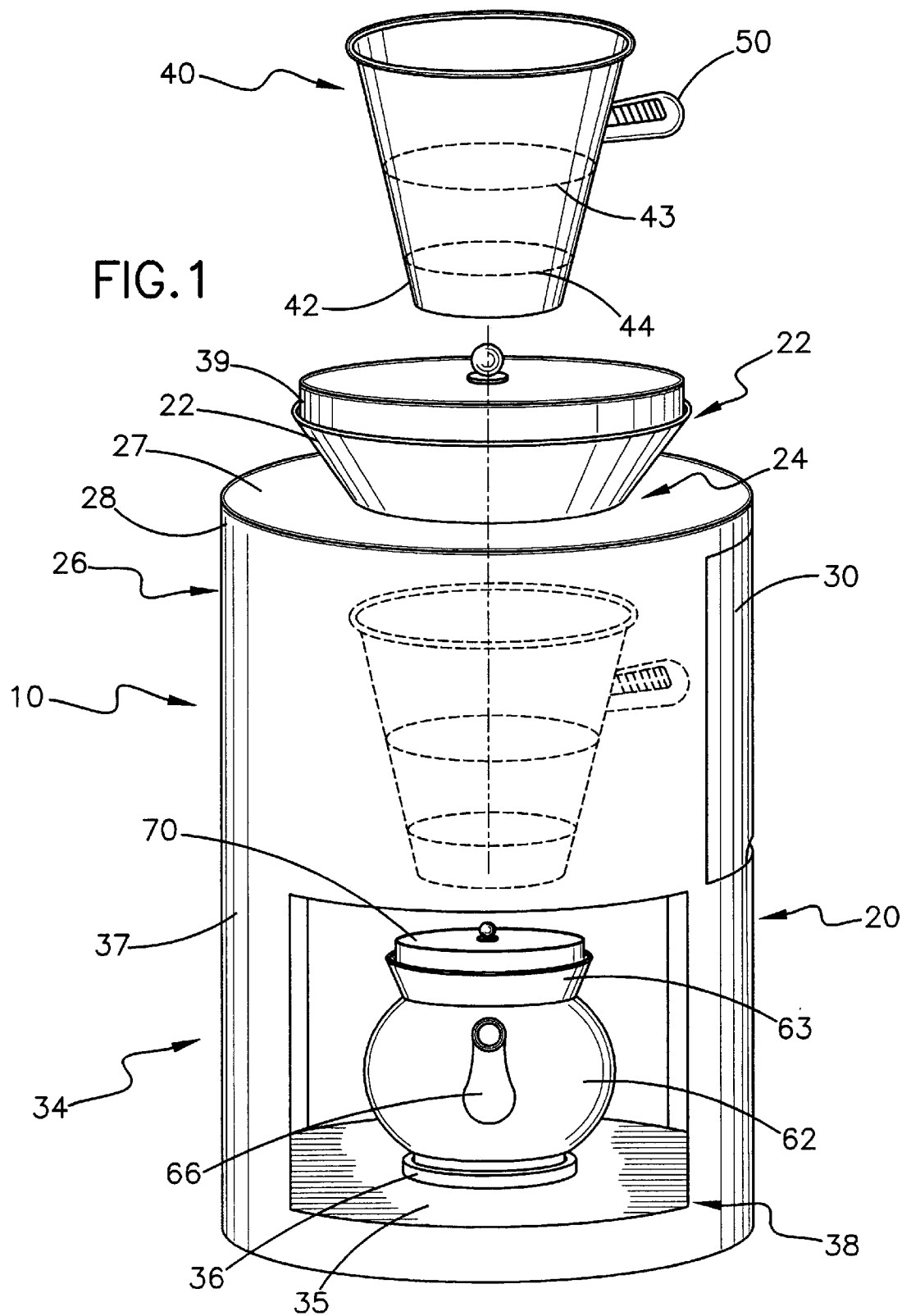
FIG. 1 is a schematic perspective view of a new cooking oil storage and filtering system according to the present invention.
Figure 2:
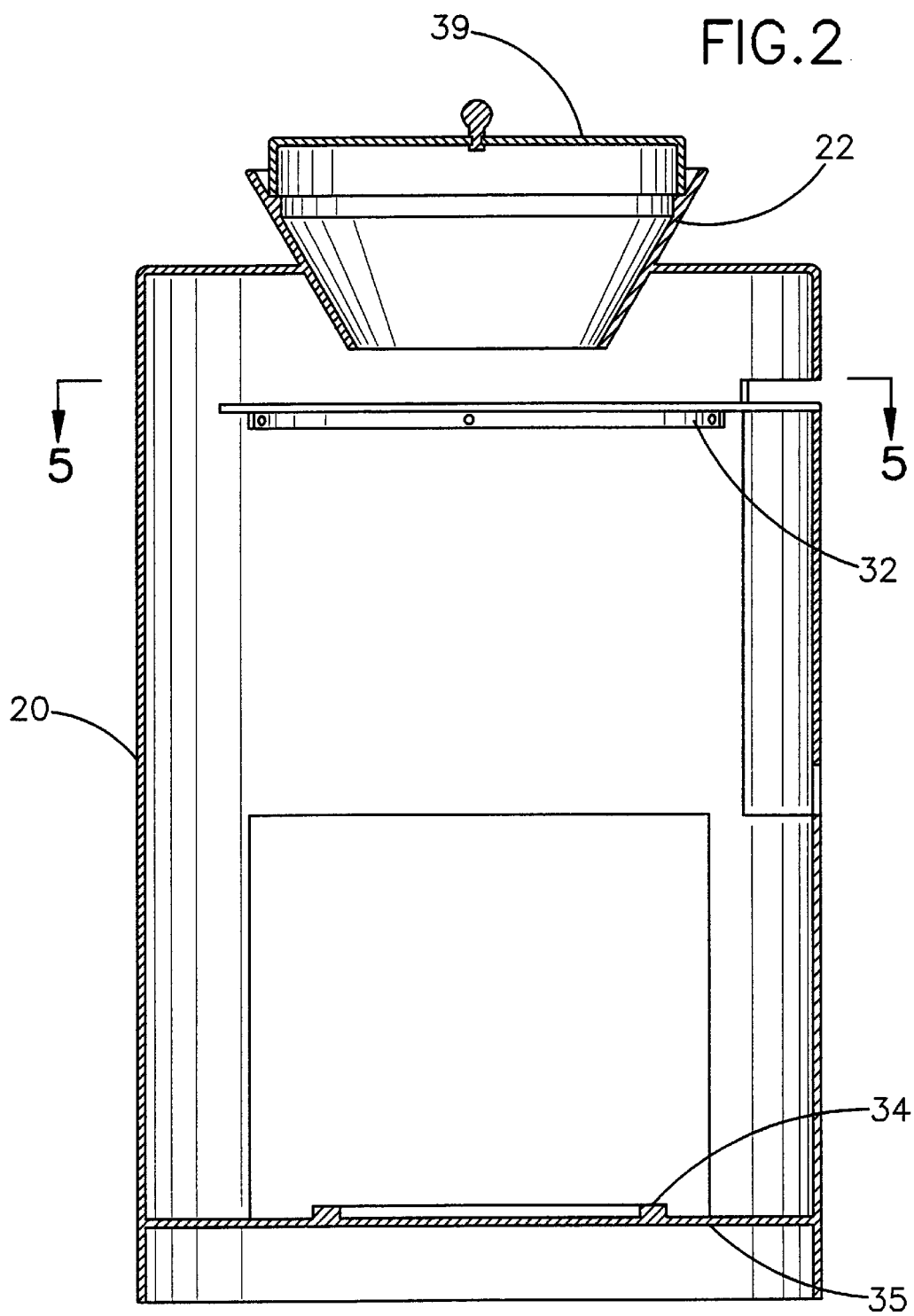
FIG. 2 is a schematic cross-sectional view of the present invention.
Figure 3:
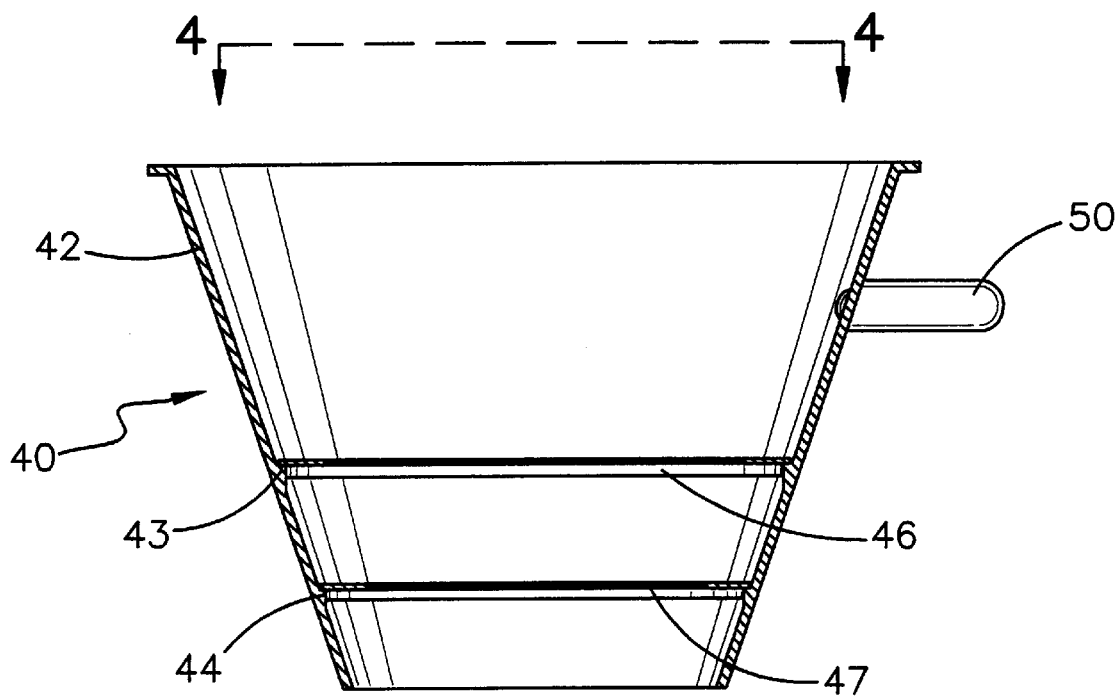
FIG. 3 is a schematic side view of the filter assembly of the present invention.
Figure 4:
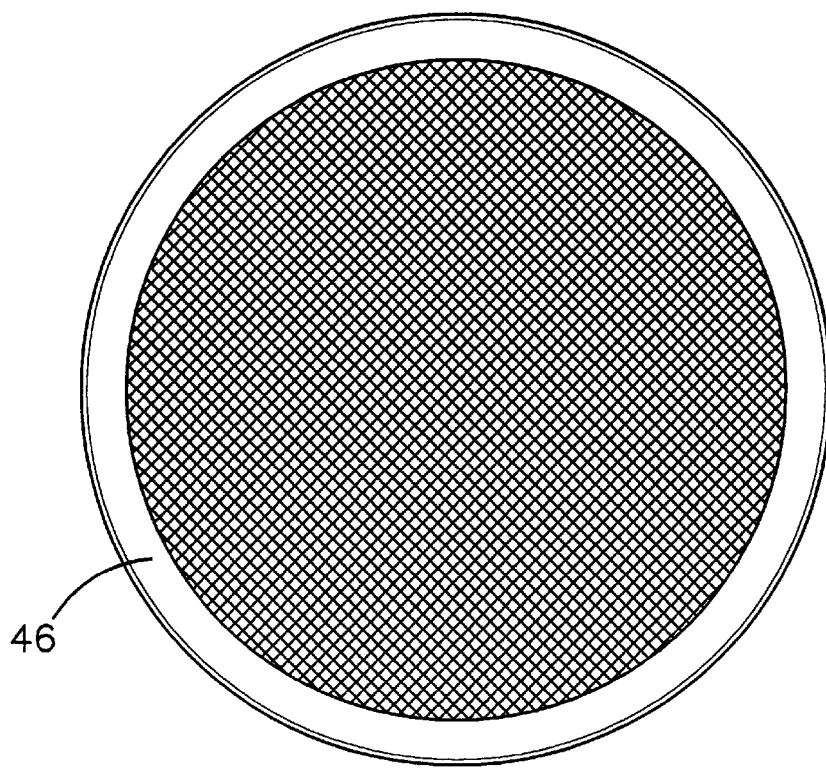
FIG. 4 is a schematic top view of the first filter screen of the present invention.
Figure 5:
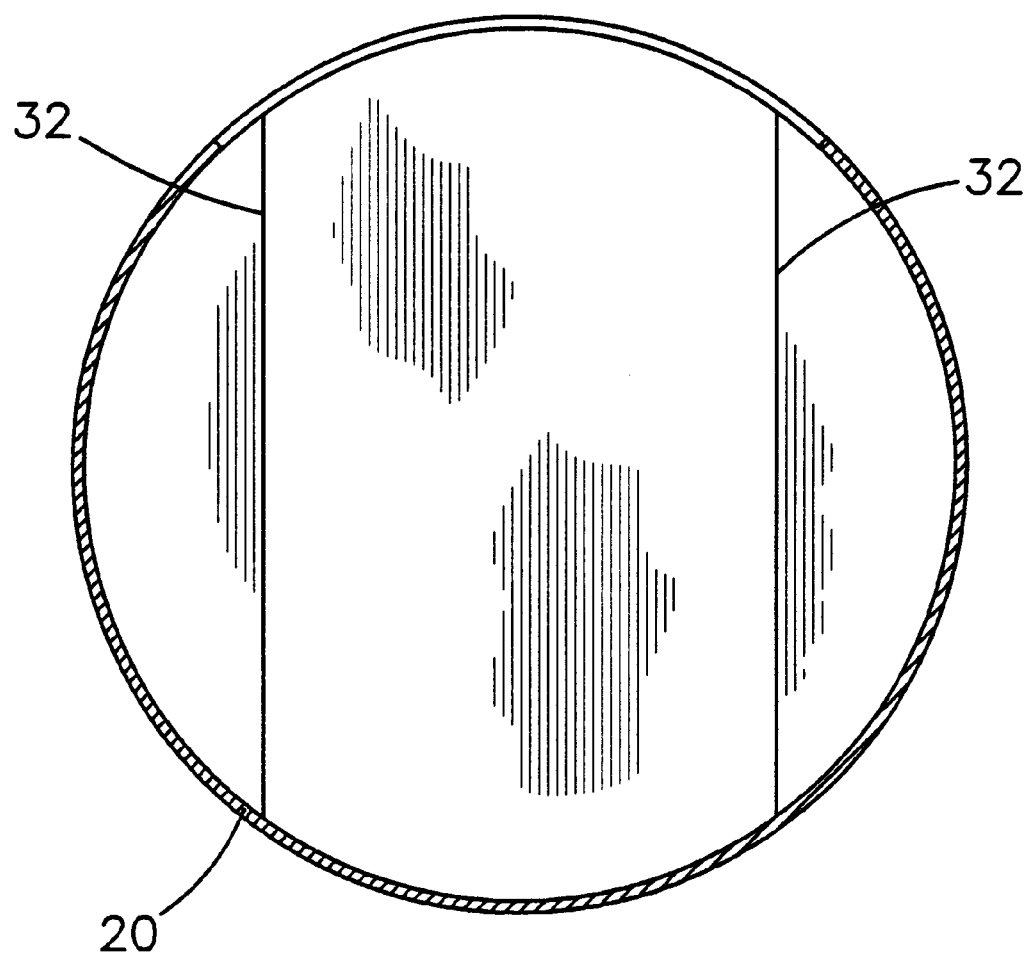
FIG. 5 is a schematic cross-sectional view of the present invention taken along line 5—5 of FIG. 2.

With reference now to the drawings, and in particular to FIGS. 1 through 5 thereof, a new cooking oil storage and filtering system embodying the principles and concepts of the present invention and generally designated by the reference numeral 10 will be described.

As best illustrated in FIGS. 1 through 5, the cooking oil storage and filtering system 10 generally comprises an housing assembly 20, a filter assembly 40, and a kettle assembly 60.

The housing assembly 20 includes a funnel portion 22, an upper portion 26, a bottom portion 34, a pair of track members 32, and a housing lid member 39.

The filter assembly 40 is slidably insertable into the housing assembly 20 along the track members 32. The filter assembly 40 is designed for removing particulate matter from a quantity of cooking oil.

The kettle assembly 60 is removably positioned within the bottom portion 34 of the housing assembly 20. The kettle assembly 60 is designed for storing the quantity of cooking oil.

The housing assembly 20 is elongate. The housing assembly 20 is substantially cylindrical. The bottom portion 34 of the housing assembly 20 comprises a bottom wall 35, a base member 36, and a perimeter wall 37 extending upwardly from the bottom wall 35.

The perimeter wall 37 of the bottom portion 34 includes a pair of opening 38. A first one of the openings 38 is positioned in an opposed relationship to a second one of the openings 38 referenced to the perimeter wall 37. Each of the pair of openings 38 is substantially larger than the kettle assembly 60. The openings 38 are for positioning the kettle assembly 60 within the housing assembly 20.

The bottom portion 34 is integrally coupled to the upper portion 26. The upper portion 26 includes a top wall 27 and an upper portion perimeter wall 28, which extends downward from the top wall 27. The top wall 27 includes a funnel aperture positioned medially to a perimeter edge of the top wall 27. The upper portion perimeter wall 28 includes an opening 29.

The upper portion 26 includes an upper door 30. The upper door 30 is for covering the opening 29 of the upper perimeter wall 28.

The funnel portion 22 is integrally coupled to the top wall 27 along a perimeter of the funnel aperture. The funnel portion 22 includes a top end 23 and a lower end 24. The top end 23 includes a diameter substantially larger than a diameter of the lower end 24. The funnel portion 22 is substantially hollow. The funnel portion 22 is designed for receiving the quantity of cooking oil when the quantity of cooking oil is poured into the cooking oil storage and filtering system 10.

Each one of the pair of track members 32 includes a first end. Each one of the track members 32 is positioned within the housing assembly 20 such that a longitudinal axis of each one of the track members 32 is in a perpendicular relationship with a longitudinal axis of the housing assembly 20. The pair of track members 32 is in a spaced substantially parallel relationship. The first end of each one of the track members 32 is positioned adjacent to an associated edge of the opening 29 of the upper portion 26. The track members 32 are for receiving the filter assembly 40 and aligning the filter assembly 40 with the funnel portion 22.

The filter assembly 40 includes a filter assembly housing 42, a first filter screen 46, a second filter screen 47 and an handle portion 50. The filter assembly housing 42 includes a filter assembly upper end and a filter assembly lower end. The filter assembly upper end includes a diameter substantially larger than a diameter of the filter assembly lower end. The filter assembly housing 42 is substantially hollow.

The filter assembly housing 42 includes an upper annular ridge 43 and a lower annular ridge 44. The upper 43 and lower annular ridges 44 are positioned on an interior surface of the filter assembly housing 42. The upper 43 and lower annular ridges 44 are for receiving the first filter screen 46 and the second filter screen 47 respectively.

The first 46 and second filter screens 47 each includes a perimeter edge. The perimeter edge abuts the interior surface of the filter assembly housing 42 when the first 46 and second filter screens 47 are received by the upper 43 and lower annular ridges 44 respectively. The first filter screen 46 is substantially larger than the second filter screen 47. The first 46 and second filter screens 47 are designed for removing particulate matter from the quantity of cooking oil.

The handle portion 50 is integrally coupled to the filter assembly housing 42. The handle portion 50 is positioned adjacent to the filter assembly upper end. The handle portion 50 is designed for gripping by a human hand. The handle portion 50 is for facilitating the slideable removal and insertion of the filter assembly 40 into the housing assembly 20 along the track members 32.

The kettle assembly 60 includes a spout portion 66, an handle portion 68 a container portion 62, and a lid portion 70. The container portion 62 is substantially hollow. The container portion 62 includes a base wall and a perimeter wall 64, which extends upward from the base wall. The kettle assembly 60 is designed for containing and storing the quantity of cooking oil.

The container portion 62 is substantially heat resistant. The container portion 62 is designed for receiving the quantity of cooking oil when the quantity of cooking oil is hot.

The container portion 62 includes a spout aperture. The spout aperture is positioned medially along the perimeter wall 64 of the container portion 62. The spout portion 66 is integrally coupled to the container portion 62 along an edge of the spout aperture.

The handle portion 68 is positioned opposite the spout portion 66. The handle portion 68 includes a first end and a second end. The handle portion 68 is substantially U-shaped. The first and second ends of the handle portion 68 are coupled to the perimeter wall 64 of the container portion 62.

A lip portion 63 extends upwardly from an edge of the perimeter wall 64 of the container portion 62. The lip portion 63 includes a lip portion top edge and a lip portion bottom edge. The lip portion top edge includes a diameter substantially larger than a diameter of the lip portion bottom edge. The lip portion 63 is for receiving the lid portion 70.

In use, the kettle assembly is positioned within the housing assembly. The filter assembly is inserted into the housing assembly along the track members with the first and second screens positioned within the filter assembly. The housing lid member is removed. The used cooking oil is poured into the funnel portion of the housing assembly. The cooking oil flows through the filter assembly and into the kettle assembly for storage. The housing lid member is then replaced. When the user desires to remove the kettle assembly from the housing assembly, the kettle lip portion can be placed on the lip portion of the container portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking oil storage and filtering system comprising:
   an housing assembly, said housing assembly having a funnel portion, an upper portion, a bottom portion, a pair of track members, and a housing lid member;
   a filter assembly, said filter assembly being slidably insertable into said housing assembly along said track members, said filter assembly being adapted for removing particulate matter from a quantity of cooking oil;
   a kettle assembly, said kettle assembly being removably positioned within said bottom portion of said housing, said kettle assembly being adapted for storing the quantity of cooking oil;
   said filter assembly having a filter assembly housing, a first filter screen, a second filter screen and an handle portion, said filter assembly housing having a filter assembly upper end, and a filter assembly lower end, said filter assembly upper end having a diameter larger than a diameter of said filter assembly lower end, said filter assembly housing being substantially hollow;
   said filter assembly housing having an upper annular ridge and a lower annular ridge, said upper and lower annular ridges being positioned on an interior surface of said filter assembly housing, said upper and lower annular ridges being for receiving said first filter screen and said second filter screen respectively;
   said first and second filter screens each having a perimeter edge, said perimeter edge abutting said interior surface of said filter assembly housing when said first and second filter screens are received by said upper and lower annular ridges respectively, said first filter screen being substantially larger than said second filter screen, said first and second filter screens being adapted for removing particulate matter from the quantity of cooking oil.

2. The cooking oil storage and filtering system of claim 1, further comprising:
   said housing assembly being elongate, said housing assembly being substantially cylindrical, said bottom portion of said housing assembly comprising a bottom wall, a base member, and a perimeter wall extending upwardly from said bottom wall;
   said perimeter wall of said bottom portion having a pair of openings, a first one of said openings being positioned in an opposed relationship to a second one of said openings referenced to said perimeter wall, each of said pair of openings being substantially larger than said kettle assembly, said openings being for positioning said kettle assembly within said housing assembly.

3. The cooking oil storage and filtering system of claim 1, further comprising:
   said bottom portion being integrally coupled to said upper portion, said upper portion having a top wall and a upper portion perimeter wall extending downwardly therefrom, said top wall having a funnel aperture positioned medially to a perimeter edge of said top wall, said upper portion perimeter wall having an opening;
   said upper portion having an upper door, said upper door being for covering said opening of said upper perimeter wall.

4. The cooking oil storage and filtering system of claim 3, further comprising:
   said funnel portion being integrally coupled to said top wall along a perimeter of said funnel aperture, said funnel portion having a top end and a lower end, said top end having a diameter substantially larger than a diameter of said lower end, said funnel portion being substantially hollow, said funnel portion being adapted for receiving the quantity of cooking oil when the quantity of cooking oil is poured into said cooking oil storage and filtering system.

5. The cooking oil storage and filtering system of claim 4, further comprising:

each one of said pair of track members having a first end, each one of said track members being positioned within said housing assembly such that a longitudinal axis of each one of said track members being in a perpendicular relationship with a longitudinal axis of said housing assembly, said pair of track members being in a spaced substantially parallel relationship, said first end of each one of said track members being positioned adjacent to an associated edge of said opening of said upper portion, said track members being for receiving said filter assembly and aligning said filter assembly with said funnel portion.

6. The cooking oil storage and filtering system of claim 1, further comprising:

said handle portion being integrally coupled to said filter assembly housing, said handle portion being positioned adjacent said filter assembly upper end, said handle portion being adapted for gripping by a human hand, said handle portion being for facilitating the slidable removal and insertion of said filter assembly into said housing assembly along said track members.

7. The cooking oil storage and filtering system of claim 1, further comprising:

said kettle assembly having a spout portion, an handle portion, a container portion, and a lid portion, said container portion being substantially hollow, said container portion having a base wall and a perimeter wall extending upwardly therefrom, said kettle assembly being adapted for containing and storing the quantity of cooking oil.

8. The cooking oil storage and filtering system of claim 7, further comprising:

said container portion being substantially heat resistant, said container portion being adapted for receiving the quantity of cooking oil when the quantity of cooking oil is hot.

9. The cooking oil storage and filtering system of claim 7, further comprising:

said container portion having a spout aperture, said spout aperture being positioned medially along said perimeter wall of said container portion, said spout portion being integrally coupled to said container portion along an edge of said spout aperture.

10. The cooking oil storage and filtering system of claim 9, further comprising:

said handle portion being positioned opposite said spout portion, said handle portion having a first end and a second end, said handle portion being substantially U-shaped, said first and second ends of said handle portion being coupled to said perimeter wall of said container portion.

11. The cooking oil storage and filtering system of claim 7, further comprising:

a lip portion, said lip portion extending upwardly from an edge of said perimeter wall of said container portion, said lip portion having a lip portion top edge and a lip portion bottom edge, said lip portion top edge having a diameter substantially larger than a diameter of said lip portion bottom edge, said lip portion being for receiving said lid portion.

12. A cooking oil storage and filtering system comprising:

an housing assembly, said housing assembly having a funnel portion, an upper portion, a bottom portion, a pair of track members, and a housing lid member;

a filter assembly, said filter assembly being slidably insertable into said housing assembly along said track members, said filter assembly being adapted for removing particulate matter from a quantity of cooking oil;

a kettle assembly, said kettle assembly being removably positioned within said bottom portion of said housing, said kettle assembly being adapted for storing the quantity of cooking oil;

said housing assembly being elongate, said housing assembly being substantially cylindrical, said bottom portion of said housing assembly comprising a bottom wall, a base member, and a perimeter wall extending upwardly from said bottom wall;

said perimeter wall of said bottom portion having a pair of opening, a first one of said openings being positioned in an opposed relationship to a second one of said openings referenced to said perimeter wall, each of said pair of openings being substantially larger than said kettle assembly, said openings being for positioning said kettle assembly within said housing assembly;

said bottom portion being integrally coupled to said upper portion, said upper portion having a top wall and a upper portion perimeter wall extending downwardly therefrom, said top wall having a funnel aperture positioned medially to a perimeter edge of said top wall, said upper portion perimeter wall having an opening;

said upper portion having an upper door, said upper door being for covering said opening of said upper perimeter wall;

said funnel portion being integrally coupled to said top wall along a perimeter of said funnel aperture, said funnel portion having a top end and a lower end, said top end having a diameter substantially larger than a diameter of said lower end, said funnel portion being substantially hollow, said funnel portion being adapted for receiving the quantity of cooking oil when the quantity of cooking oil is poured into said cooking oil storage and filtering system;

each one of said pair of track members having a first end, each one of said track members being positioned within said housing assembly such that a longitudinal axis of each one of said track members being in a perpendicular relationship with a longitudinal axis of said housing assembly, said pair of track members being in a spaced substantially parallel relationship, said first end of each one of said track members being positioned adjacent to an associated edge of said opening of said upper portion, said track members being for receiving said filter assembly and aligning said filter assembly with said funnel portion;

said filter assembly having a filter assembly housing, a first filter screen, a second filter screen and an handle portion, said filter assembly housing having a filter assembly upper end, and a filter assembly lower end, said filter assembly upper end having a diameter substantially larger than a diameter of said filter assembly lower end, said filter assembly housing being substantially hollow;

said filter assembly housing having an upper annular ridge and a lower annular ridge, said upper and lower annular ridges being positioned on an interior surface of said filter assembly housing, said upper and lower annular ridges being for receiving said first filter screen and said second filter screen respectively;

said first and second filter screens each having a perimeter edge, said perimeter edge abutting said interior surface of said filter assembly housing when said first and second filter screens are received by said upper and lower annular ridges respectively, said first filter screen being substantially larger than said second filter screen, said first and second filter screens being adapted for removing particulate matter from the quantity of cooking oil;

said handle portion being integrally coupled to said filter assembly housing, said handle portion being positioned adjacent said filter assembly upper end, said handle portion being adapted for gripping by a human hand, said handle portion being for facilitating the slideable removal and insertion of said filter assembly into said housing assembly along said track members;

said kettle assembly having a spout portion, an handle portion, a container portion, and a lid portion, said container portion being substantially hollow, said container portion having a base wall and a perimeter wall extending upwardly therefrom, said kettle assembly being adapted for containing and storing the quantity of cooking oil;

said container portion being substantially heat resistant, said container portion being adapted for receiving the quantity of cooking oil when the quantity of cooking oil is hot;

said container portion having a spout aperture, said spout aperture being positioned medially along said perimeter wall of said container portion, said spout portion being integrally coupled to said container portion along an edge of said spout aperture;

said handle portion being positioned opposite said spout portion, said handle portion having a first end and a second end, said handle portion being substantially U-shaped, said first and second ends of said handle portion being coupled to said perimeter wall of said container portion;

a lip portion, said lip portion extending upwardly from an edge of said perimeter wall of said container portion, said lip portion having a lip portion top edge and a lip portion bottom edge, said lip portion top edge having a diameter substantially larger than a diameter of said lip portion bottom edge, said lip portion being for receiving said lid portion.

\* \* \* \* \*